United States Patent
Henderson

(10) Patent No.: US 6,783,148 B2
(45) Date of Patent: Aug. 31, 2004

(54) INFLATABLE CURTAIN POSITIONING SYSTEM AND METHOD

(75) Inventor: David Henderson, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 110 days.

(21) Appl. No.: 10/047,200

(22) Filed: Jan. 14, 2002

(65) Prior Publication Data

US 2003/0132615 A1 Jul. 17, 2003

(51) Int. Cl.$^7$ .......................... B60R 21/20; B60R 21/26
(52) U.S. Cl. .................. 280/728.2; 280/741; 280/730.2
(58) Field of Search ........................... 280/728.2, 730.2, 280/741

(56) References Cited

U.S. PATENT DOCUMENTS

| | | | | |
|---|---|---|---|---|
| 5,062,664 A | * | 11/1991 | Bishop et al. ........... | 280/728.2 |
| 5,498,029 A | * | 3/1996 | Mossi et al. ................ | 280/741 |
| 5,533,750 A | * | 7/1996 | Karlow et al. ........... | 280/730.2 |
| 5,899,485 A | * | 5/1999 | Folsom et al. ........... | 280/728.2 |
| 6,000,715 A | | 12/1999 | Tschaeschke | |
| 6,073,961 A | * | 6/2000 | Bailey et al. ............ | 280/730.2 |
| 6,082,761 A | * | 7/2000 | Kato et al. ............... | 280/730.2 |
| 6,224,089 B1 | * | 5/2001 | Uchiyama et al. ....... | 280/728.2 |
| 6,237,943 B1 | | 5/2001 | Brown | |
| 6,439,604 B1 | * | 8/2002 | Al-Amin et al. ........... | 280/736 |
| 6,474,680 B1 | * | 11/2002 | Miyahara et al. ........ | 280/730.2 |
| 6,485,052 B2 | * | 11/2002 | Specht ...................... | 280/736 |

FOREIGN PATENT DOCUMENTS

JP         01-138855 jj      *  5/2001

* cited by examiner

Primary Examiner—Ruth Ilan
(74) Attorney, Agent, or Firm—Sally J. Brown

(57) ABSTRACT

An inflatable curtain positioning system may include an inflator and an inflatable curtain. The inflator may have a neck for receiving the inflatable curtain. A protrusion, such as a hook or tab, may be disposed on the neck. The inflatable curtain may include a throat to be disposed around the neck of the inflator. An opening may be disposed within the throat. In one configuration, the opening may be positioned to receive the protrusion only when the curtain is situated at a desired location relative to the housing.

20 Claims, 4 Drawing Sheets

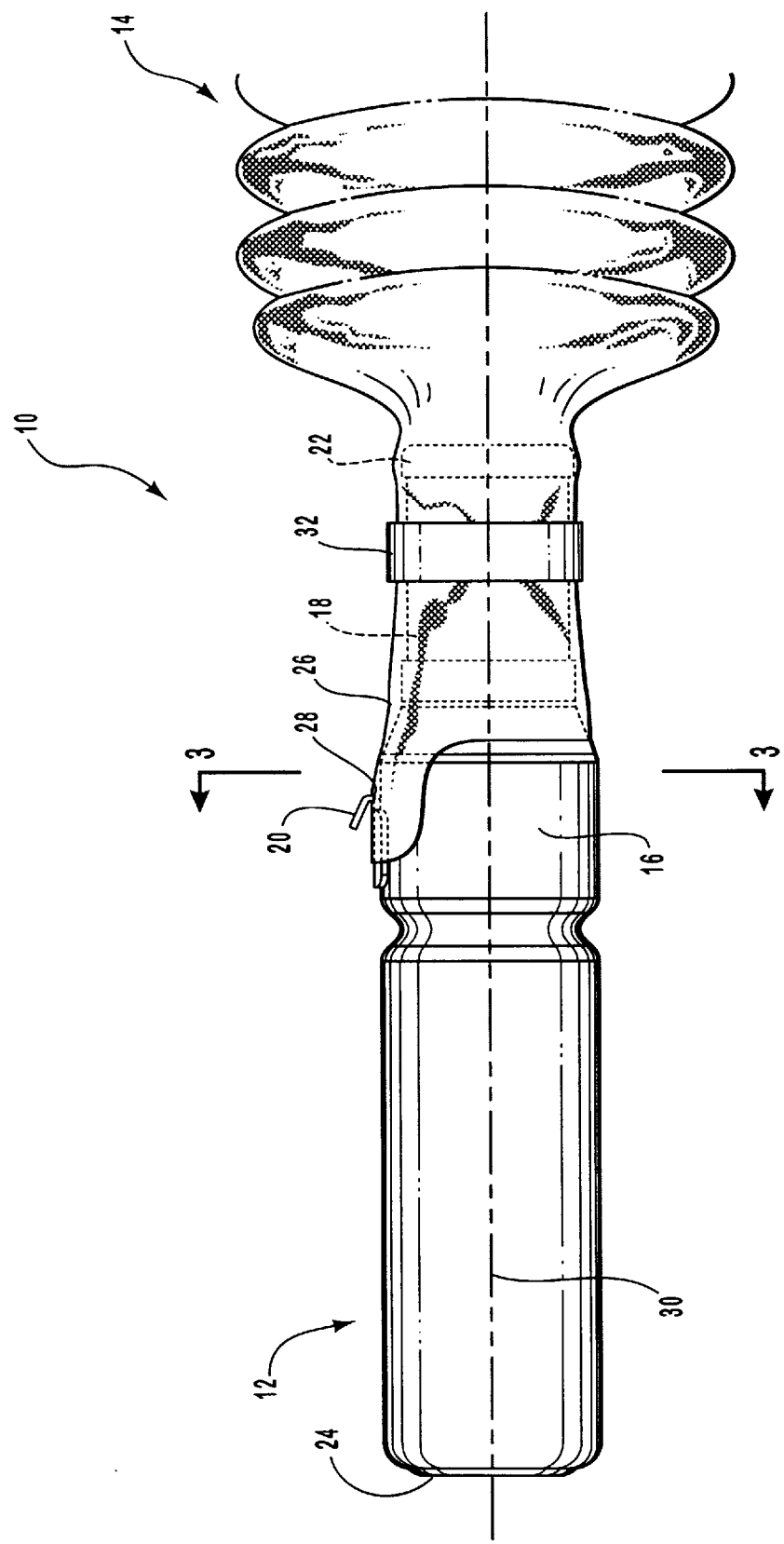

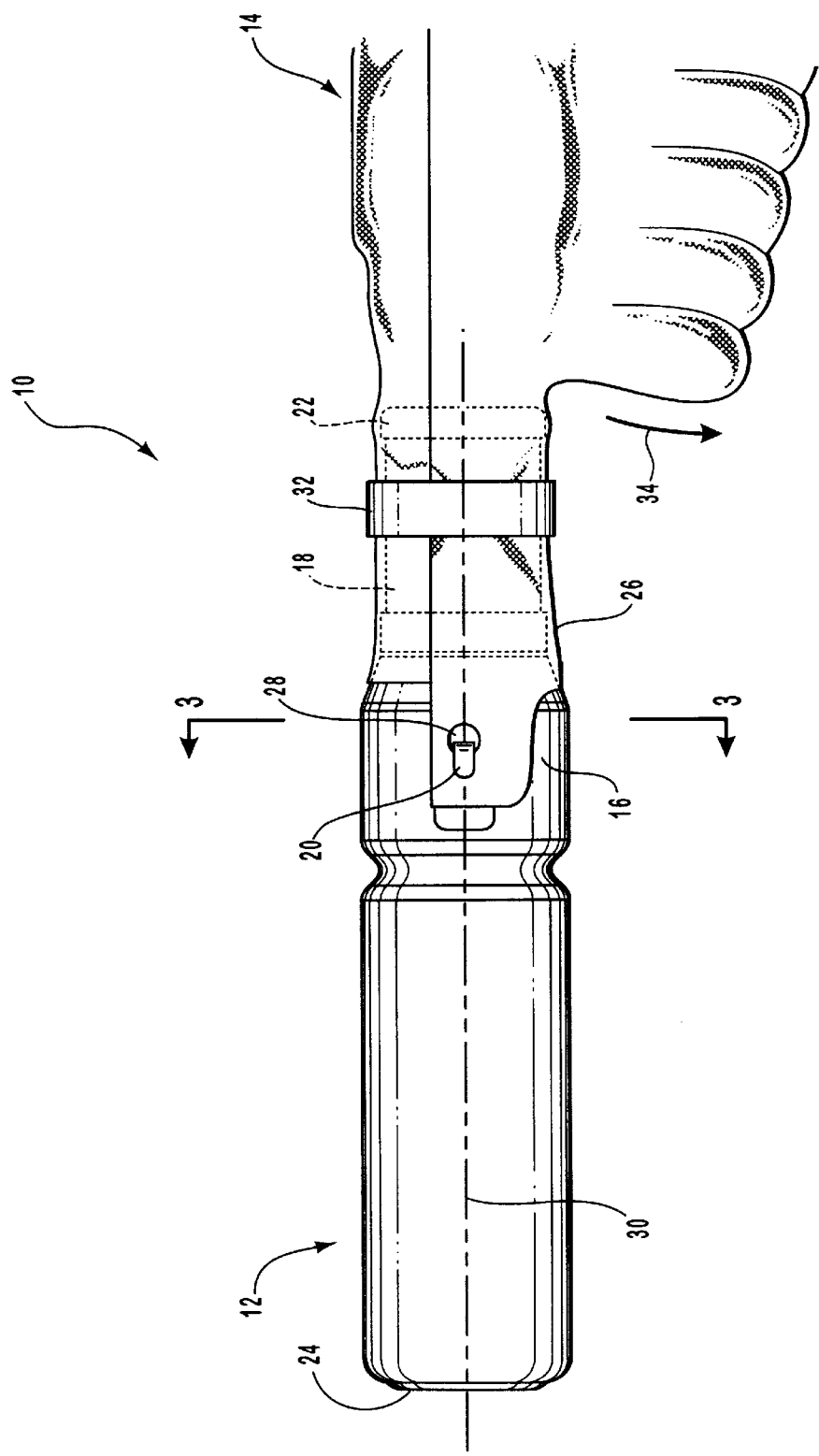

INFLATABLE CURTAIN POSITIONING SYSTEM AND METHOD

BACKGROUND OF THE INVENTION

1. Field of the Invention

The present invention relates to an airbag curtain positioning system and method. More specifically, the present invention relates to a system and a method for positioning an airbag curtain at a desired location relative to an airbag inflator during attachment of the curtain to the inflator.

2. Technical Background

Inflatable airbags are well accepted in their use in motor vehicles and have been credited with preventing numerous deaths and accidents. Some statistics estimate that frontal airbags reduce fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Thus, airbag use presents clear benefits.

Airbags may be positioned in a variety of locations throughout the vehicle. Airbags located within the steering wheel aid in preventing the driver from striking the steering wheel and the windshield in the event of an accident. Airbags have also been placed in the dashboard directly in front of the passenger seat in a vehicle. Knee bags have also been created to prevent an occupant's lower body from striking the vehicle. More recently, airbags have been installed on the interior sides of a vehicle to prevent occupants from striking the doors and windows of the vehicle during an accident. This type of airbag is frequently referred to as an inflatable curtain.

Previously, sensors were placed in a vehicle's bumpers to determine when to deploy the airbag curtain. A modern airbag curtain apparatus, however, may include an electronic control unit (ECU). The ECU is usually installed in the middle of an automobile, between the passenger and engine compartment. The ECU includes a sensor that continuously monitors the acceleration and deceleration of the vehicle. The ECU sends this information to a processor that analyzes the information with an algorithm to determine whether the vehicle is in an accident.

When the processor determines that there is an accident situation, the ECU transmits an electrical signal to an initiator in, for example, an airbag curtain module. The initiator triggers operation of the inflator. The inflator inflates a textile airbag curtain to prevent injury to the passenger. In some airbag apparatuses, the airbag may be fully inflated within 50 thousands of a second and deflated within two tenths of a second. Tremendous force is required to inflate the airbag so quickly.

Airbag inflators come in a number of different varieties. Some inflators, which are often referred to as "stored gas inflators," simply store the gas in a high-pressure state and release the gas during an impact. "Pyrotechnic" inflators, by contrast, do not store gas; rather, they contain propellants that, upon ignition, react to produce the gas. "Hybrid" inflators utilize compressed gas in combination with pyrotechnics to produce the gas. In some instances, the pyrotechnic can also open or rupture a chamber containing pressurized gases, allowing the pressurized gas to escape and inflate into an attached airbag. Whatever the type of inflator, tremendous pressure and heat are generated at the moment of impact.

Because of the tremendous stress placed on an inflatable curtain and inflator during an accident, correctly assembling and installing these items is critical to avoid product failure or costly reinstallation procedures. During the manufacturing process, an inflatable curtain is often attached to an inflator using a clamp. If the inflatable curtain is not correctly positioned relative to the inflator when it is clamped to the inflator, serious consequences can result. For example, inflatable curtains are often installed just above a door to a vehicle and, in an accident, deploy in an outward and/or downward direction to prevent the occupants from striking the door or window. Thus, an inflatable curtain is generally not symmetrical and involves an angle of deployment. An inflatable curtain, as a consequence, could be improperly installed and deploy into the ceiling of the vehicle, failing to prevent an occupant from striking a side door or window. Also, if an inflatable curtain is not correctly positioned relative to the inflator, the airbag curtain may be twisted during installation and rip or otherwise fail to correctly deploy.

Also, an airbag curtain should be correctly positioned along the longitudinal axis of the inflator. If there is too much overlap or too little overlap between the airbag curtain and the inflator, problems may arise. For instance, if there is too little overlap, leaks may allow inflator gas to escape during inflation. It is even possible that the extreme force of deployment may cause the curtain to separate from the inflator. If there is too much overlap, the clamp may bind a portion of the airbag curtain that was designed to expand during inflation, again preventing correct deployment.

To further exacerbate the situation, assembly-line workers attach the inflatable curtain to the inflator when the curtain is in a folded state, making it even more difficult to determine how the curtain should be oriented with respect to the inflator. Additionally, these workers are often presented with a very short period of time to perform this repetitive operation, increasing the possibility of human error.

Thus, it would be an advancement in the art if a method and system could be developed that quickly and easily indicates to an assembly-line worker when an inflatable curtain is correctly positioned relative to an inflator. It would be a further advancement if such a system could ensure correct positioning of the inflatable curtain along a longitudinal axis of the inflator. It would also be beneficial if such a system and method could ensure that the angle of deployment of an airbag curtain is correctly positioned relative to the inflator. This advancement would significantly be enhanced if implemented in a cost-effective manner.

Such a device is disclosed and claimed herein.

SUMMARY OF THE INVENTION

The apparatus and methods of the present invention have been developed in response to the present state-of-the-art, and, in particular, in response to problems and needs in the art that have not yet been fully resolved by currently available airbag curtain inflator systems. The present invention provides an apparatus for enhancing the effectiveness of airbag curtain inflator systems. To achieve the foregoing, and in accordance with the invention as embodied and broadly described in the preferred embodiment, an airbag curtain inflator system that diminishes the risk of improper attachment of an inflator to an airbag curtain is disclosed.

The inflatable curtain positioning system of the present invention may include a curtain inflator and an inflatable curtain. The inflator generates inflator gas for inflating the curtain. To accomplish this, the curtain inflator may implement, for example, compressed gas, pyrotechnic, or hybrid techniques, as discussed above.

The inflator may include a housing having a neck. The neck is designed to receive the inflatable curtain.

A protrusion is disposed on the neck. The protrusion may be embodied in various forms, such as a hook or a tab. The inflator may have a proximal end (an end closest to the inflatable curtain) and a distal end. In one implementation, a hook curves toward the distal end of the inflator.

In one embodiment, the inflator does not include an outer protective housing. Thus, one or more of the protrusions may be disposed directly on the inflator, not the housing.

Alternatively, the tab may project in a generally perpendicular direction away from the surface of the housing. Naturally, a tab may be shaped in a variety of different ways such that the tab has, for example, a circular-, square-, or rectangular-shaped intersection with the housing.

The inflatable curtain includes a throat configured to be disposed around the neck of the inflator. An opening is disposed within the throat. The opening may be configured to receive the protrusion only when the curtain is positioned at a desired location relative to the housing.

Positioning the curtain relative to the housing involves at least two variables. First, the curtain may be positioned at a desired location along a longitudinal axis of the housing. If there is too little overlap between the curtain and the longitudinal axis of the housing, the seal between the inflator and curtain may not be airtight, allowing inflator gas to escape during inflation. It is even possible that the extreme force of deployment may cause the curtain to separate from the inflator, if the overlap is inadequate. If there is too much overlap, the clamp (which secures the curtain to the housing) may bind a portion of the curtain that was designed to expand during inflation.

Second, an inflatable curtain is generally not symmetrical and involves an angle of deployment. The angle of deployment is the direction in which the curtain inflates in the event of an accident. As a consequence, an inflatable curtain may be improperly installed and deploy, for example, into the ceiling of the vehicle, failing to protect an occupant. Additionally, if an inflatable curtain is not correctly positioned relative to the housing the airbag curtain may be twisted during installation and rip or otherwise fail to correctly deploy when inflated.

To assemble an inflatable curtain system of the present invention, a worker positions the neck of the inflator within the throat of the curtain. The worker then places the curtain on the housing such that the protrusion is positioned within the opening. Thereafter, a clamp may be used to secure the curtain to the housing. Thus, assembly is simple and virtually eliminates positioning errors present in conventional systems. More particularly, the opening may be manufactured to receive the protrusion only when the curtain is positioned at a desired location along the longitudinal axis of the housing and when the angle of deployment of the curtain is at a desired location relative to the housing The clamp may secure the curtain to the inflator. The clamp may be embodied in various forms, including, for example, a hose clamp or ring.

In one alternative design, at least two protrusions are disposed on the housing and mating openings are disposed within the throat of the curtain. The protrusions and mating openings may be placed at irregularly spaced intervals along the perimeter of the housing, such that each protrusion fits within mating openings only when the curtain is positioned at a desired location relative to the housing.

This invention presents a significant advancement in the art in that it provides an assembly-line worker with clear, easy-to-follow guidance in positioning an inflator relative to a curtain during assembly. More particularly, when the present invention includes either one opening and one protrusion or a plurality of irregularly spaced protrusions and a plurality of mating openings, the inflatable curtain positioning system provides an assembly-line worker with essentially only one way of positioning the inflator relative to the curtain. Conventional airbag curtain systems provide little or no guidance to an assembly-line worker for positioning these two items, resulting in potentially dangerous and/or costly errors. As a consequence, the present invention may decrease training and quality control costs.

These and other advantages of the present invention will become more fully apparent from the following description and appended claims, or maybe learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which:

FIG. 1 is a side perspective view of an inflatable curtain positioning system in an assembled state and wherein the curtain is inflated;

FIG. 2 is a perspective top view of an inflatable curtain positioning system wherein the curtain is inflated;

DETAILED DESCRIPTION OF THE PREFERRED EMBODIMENTS

Figure 4:
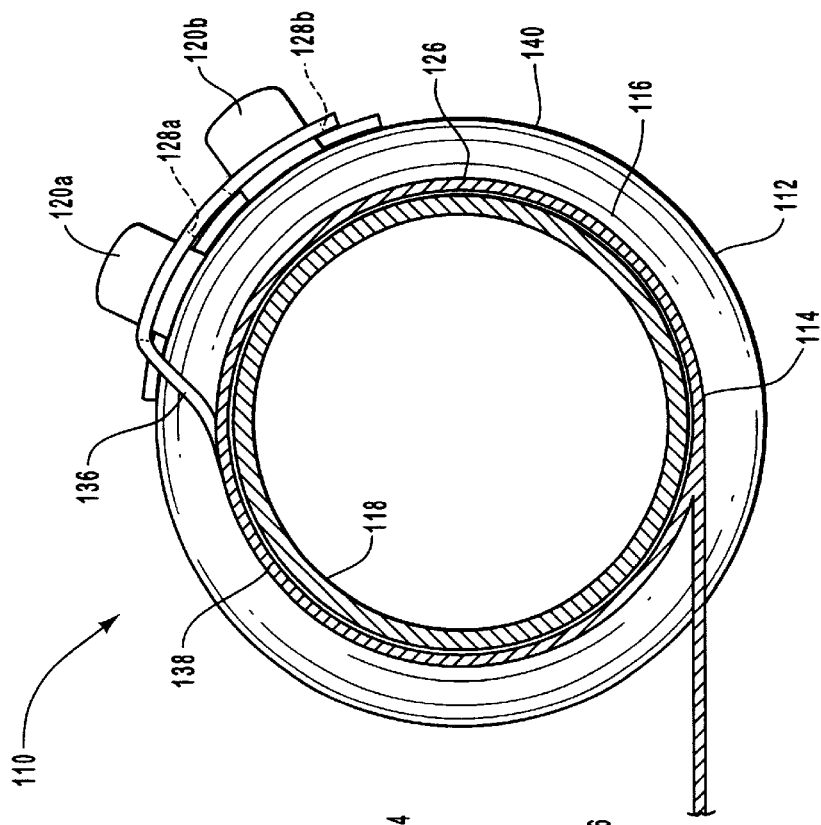
FIG. 4 is a cross-sectional view of an alternative embodiment of an inflatable curtain positioning system.

The preferred embodiments of the invention are now described with reference to FIGS. 1–5, where like reference numbers indicate identical or functionally similar elements. The members of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Furthermore, the particular features, structures, or characteristics may be combined in any suitable manner in one or more embodiments. In the following description, numerous specific details are provided to convey a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

With reference to FIGS. 1 and 2, an inflatable curtain positioning system 10 may include a curtain inflator 12 and an inflatable curtain 14. The inflator 12 generates inflator gas for inflating the curtain 14. To accomplish this, the curtain inflator 12 may implement, for example, compressed gas, pyrotechnic, or hybrid techniques, as discussed above.

The inflator 12 may include a housing 16 having a neck 18. The neck 18 is designed to receive the inflatable curtain 14 and, as a consequence, may be, but is not necessarily, narrower than adjacent portions of the housing 16. Also, it should be noted that the housing 16 does not necessarily cover the entire inflator 12. Instead, the housing 16 may cover only a portion of the inflator 12. In addition, as discussed below, the inflator 12 does not necessarily include a housing 16.

A protrusion 20 is disposed on the neck 18. The protrusion 20 may be embodied in various forms, such as a hook or a tab. The inflator 12 may have a proximal end 22 (an end closest to the inflatable curtain 14) and a distal end 24. The hook may curve toward the distal end 24 of the inflator 12.

In one configuration, the tab may project in a generally perpendicular direction away from the surface of the housing 16. Naturally, a tab may be shaped in a variety of different ways such that the tab has, for example, a circular-, square-, or rectangular-shaped intersection with the housing 16.

The inflatable curtain 14 includes a throat 26 that fits around the neck 18 of the inflator 12. An opening 28 is disposed within the throat 26. The opening 28 may receive the protrusion 20 only when the curtain 14 is positioned at a desired location relative to the housing 16. Naturally, the opening 28 and the protrusion 20 may be designed to suit a manufacturer's particular needs, i.e., each model of curtain 14 and inflator 12 may operate ideally at a different desired location relative to each other.

Positioning the curtain 14 relative to the housing 16 involves at least two variables. First, the curtain may be positioned at a desired location along a longitudinal axis 30 of the housing 16. If there is too little overlap, the seal between the inflator 12 and curtain 14 may not be airtight, allowing inflator gas to escape during inflation. If the overlap is too small, it is even possible that the extreme force of deployment may cause the curtain 14 to separate from the inflator 12. If there is too much overlap, the clamp 32 (which is configured to secure the curtain 14 to the housing 16) may bind a portion of the curtain 14 that was designed to expand during inflation. Again, damage to the curtain 14 or other types of improper deployment may ensue.

Second, an inflatable curtain 14 is generally not symmetrical and involves an angle of deployment 34. The angle of deployment 34 is the direction in which the curtain 14 inflates in the event of an accident. A curtain 14 may inflate, for example, in an outward direction, as illustrated in FIG. 2 (a top perspective view of the system 10). As a consequence, an inflatable curtain 14 may be improperly installed and deploy, for example, into the ceiling of the vehicle, failing to protect an occupant. Additionally, if an inflatable curtain 14 is not correctly positioned relative to the housing 16, the airbag curtain 14 may be twisted during installation and rip or otherwise fail to correctly deploy when inflated.

As explained previously, the clamp 32 secures the curtain 14 to the inflator 12 when the curtain 14 is positioned at a desired location relative to the inflator 12. Those skilled in the art will understand that the clamp 32 may be embodied in various forms, including, for example, a hose clamp or ring.

Assembly of an inflatable curtain system using the positioning system 10 of the present invention is simple, can be performed quickly, and presents an assembly-line worker with only one logical way to position the inflatable curtain 14 relative to the housing 16. To assemble an inflator 12 and curtain 14 using the present system 10, a worker places the throat 26 of the curtain 14 around the neck 18 of the inflator 12. The worker then positions the curtain 14 relative to the housing 16 such that the protrusion 20 is disposed within the opening 28. Thereafter, a clamp 32 may be used to secure the curtain 14 to the housing 16.

The combination of the protrusion 20 and opening 28 may serve a dual purpose of positioning the inflatable curtain 14 at a desired location along the longitudinal axis 30 of the inflator 12 and of positioning the angle of deployment 34 at a desired location relative to the housing 16. Conventional systems provided an assembly worker with a wide array of undesirable options in positioning the inflatable curtain 14 relative the housing 16, which may result in potentially dangerous and costly errors. To an assembly-line worker, there is only one logical way, the correct way, to assemble an inflatable curtain system using the present invention. Additionally, use of the present invention, may diminish training and quality control costs.

Also, in an alternative embodiment, the opening 28 may be elongated. As such, the desire location may comprise, for example, a continuum of locations along the longitudinal axis 30 or a continuum of angles of deployment 34. Such an embodiment may limit the discretion of the assembly-line worker to a specific range of locations. Also, the desired location may involve some variation resulting from, for instance, limitations in the precision of the manufacturing processes.

Figure 3:
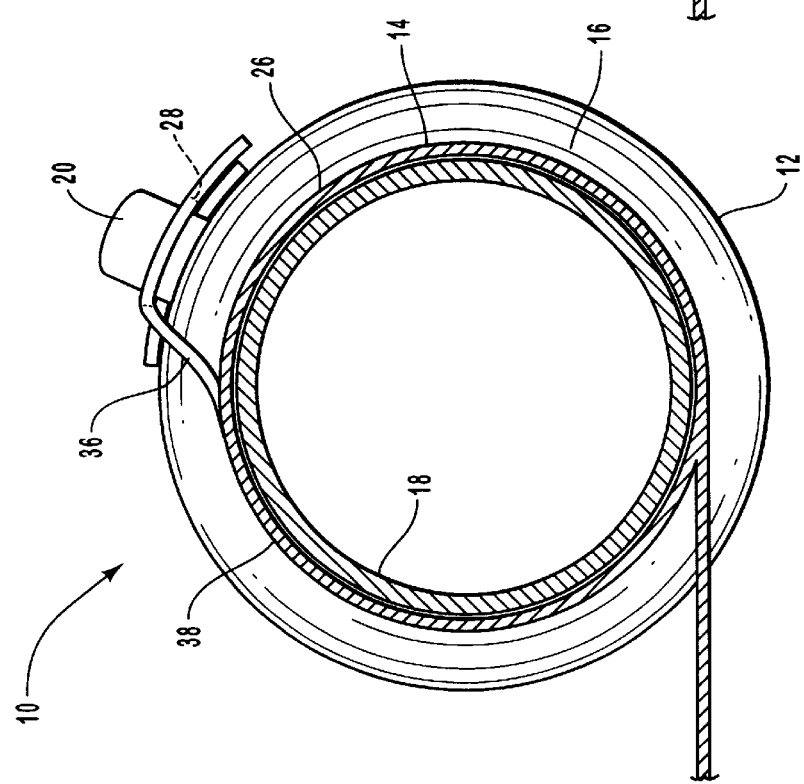
FIG. 3 is a cross-sectional view taken at line 3—3 of FIG. 2 of an inflatable curtain positioning system.

FIG. 3 is a cross-sectional view of an inflatable curtain 14 attached to an inflator 12. Here, the housing 16, or more specifically the neck 18, is positioned within the throat 26 of the curtain 14. As shown, the opening 28 is disposed within an extension 36 of the curtain 14. The extension 36 may be a section where opposing sides of the curtain 14 come together. Of course, the opening 28 may be positioned in alternative locations, such as within the main portion 38 of the throat 26, which could slide over the protrusion 20. As illustrated, the extension 36 is folded over the protrusion 20 such that the protrusion 20 is disposed within the opening 28. In the embodiment shown, there is only one opening 28 and one protrusion 20 such that the protrusion 20 is positioned within the opening 28 only when the curtain 14 is positioned at the desired location relative to the housing 16.

FIG. 4 is a cross-sectional view, similar to the cross-sectional view of FIG. 3, of an alternative embodiment of an inflatable curtain positioning system 110. As with previously disclosed embodiments, an inflator 112 and curtain 114 is included. The inflator 112 may include a housing 116 having a neck 118. Here, however, an inflator 112 having two protrusions 120a–b is disclosed. A throat 126 of the curtain 114 may include two openings 128, which mate with the two protrusions 120. Naturally, two or more protrusions 120 and mating openings 128 may be implemented in connection with the present invention. The openings 128 could be disposed, for example, within an extension 136 of the curtain 114 or within the main portion 138 of the throat 126. Having two or more protrusions 120 and mating openings 128 (as opposed to one of each of these items), may further stabilize the curtain 114 and insure correct positioning of the curtain 114 during assembly.

The protrusions 120 may be positioned at irregularly spaced intervals along a perimeter 140 of the housing 116.

If the protrusions 120 and openings 128 are positioned at regularly spaced intervals, an assembly-line worker may be presented with a number of different ways to position the curtain 114 relative to the inflator 112, even when the protrusions 102 are positioned within the openings 128. For example, if the protrusions 120 and openings 128 are positioned on opposing sides of the housing 116 (regularly spaced intervals), an assembly-line worker is presented with two options for assembling the inflator 112 and curtain 114. More specifically, in this example, a first protrusion 120a may be positioned within either a first or a second opening 128. As a consequence, when the protrusions 120 and the mating openings 128 are positioned at irregularly spaced intervals along the perimeter 140 of the housing 116, in accordance with the present invention there is only one logical way for an assembly-line worker to position the inflator 112 relative to the curtain 114.

Figure 5:
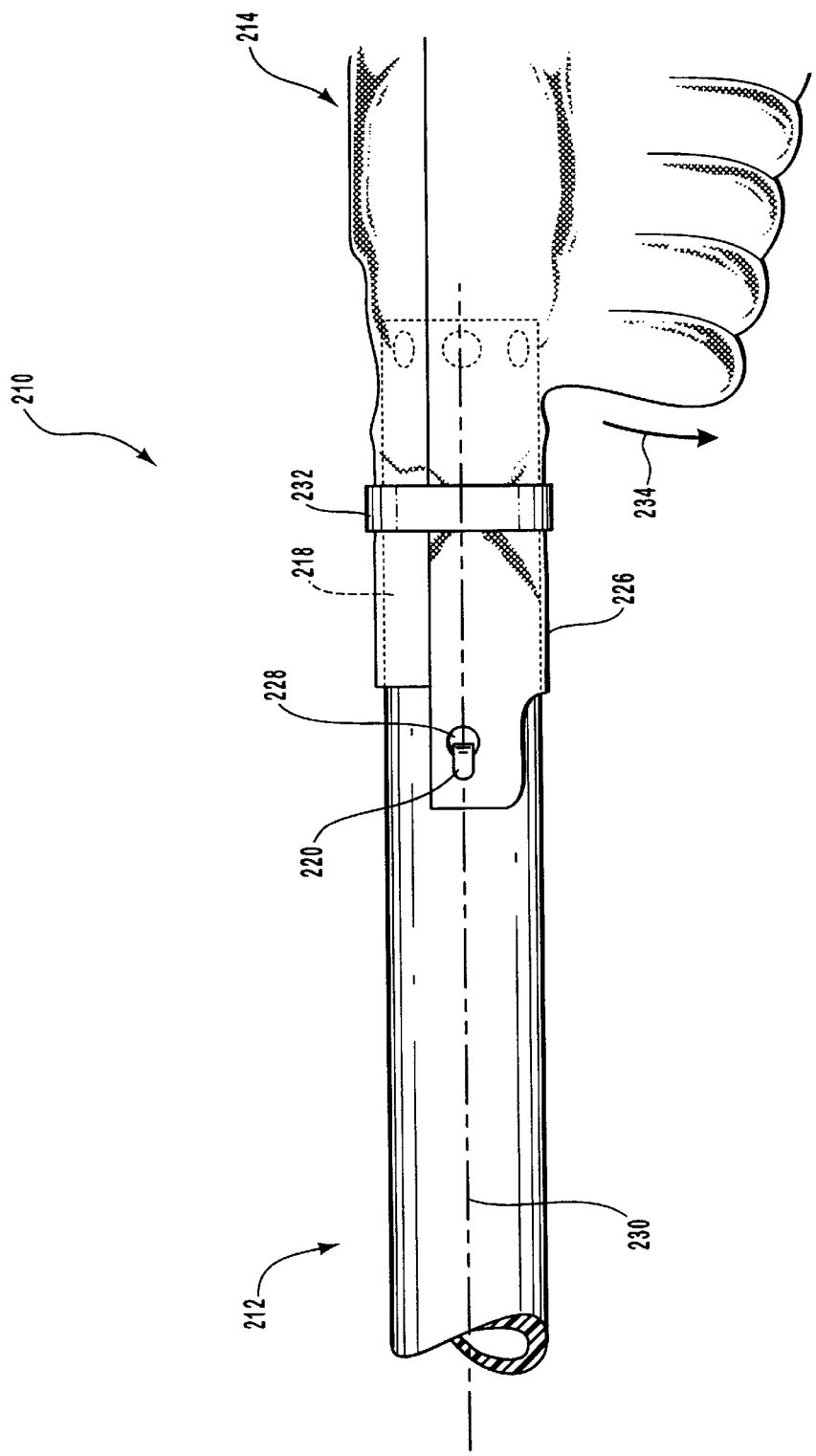
FIG. 5 is a perspective top view of an alternative embodiment of the inflatable curtain positioning system wherein the curtain is inflated.

Referring now to FIG. 5, one embodiment of the inflatable curtain positioning system 210 includes an inflator 212 without an outer protective housing 16, 116. As illustrated, the inflator 212 may be at least partially positioned within an inflatable curtain 214. A neck of the inflator 212 may be configured to receive the curtain 214. One or more protrusions 220 (e.g., a hook or tab) may be disposed directly on the inflator 212, not a housing 16, 116. Naturally, various techniques may be used to attach the protrusion or protrusions 220 to the inflator 212, such as welding, adhesives, a screw, or a nut and bolt. As before, the curtain 214 may be configured to be disposed around the inflator 212. The curtain 214 may include a throat 226 that is configured to be disposed around the inflator 212 or the neck 218 of the inflator 212.

As explained above, one or more openings 228 of the curtain 214 may receive the protrusion or protrusions 220 only when the curtain 214 is positioned at a desired location relative to the inflator 212. The inflator 212 may include a longitudinal axis 230. In addition, the curtain 214 may have an angle of deployment 234, as stated previously. The one or more openings 228 may receive the one or more protrusions 220 only when the inflator 212 is positioned at a desire location relative to the longitudinal axis 230 of the inflator 212 and/or the angle of deployment 234 of the curtain 214. When positioned at the desired location, a clamp 232 or other securing device may secure the curtain 214 to the inflator 212.

To summarize, this invention presents a significant advancement in the art in that it provides an assembly-line worker with clear, easy-to-follow guidance in positioning an inflator 12, 112 relative to a curtain 14, 114 during assembly. More particularly, in one embodiment when the present invention includes either one opening 28 and one protrusion 20 or a plurality of irregularly spaced protrusions 120 and a plurality of mating openings 128, this invention provides an assembly-line worker with only one logical way of positioning the inflator 12 relative to the curtain 14, 114. Conventional airbag curtain systems provided little or no guidance to an assembly-line worker for positioning these two items, resulting in potentially dangerous and/or costly errors. As stated before, the present invention may also decrease training and quality control costs.

The present invention may be embodied in other specific forms without departing from its scope or essential characteristics. The described embodiments are to be considered in all respects only illustrative, not restrictive. The scope of the invention is, therefore, indicated by the appended claims rather than by the foregoing description. All changes that come within the meaning and range of equivalency of the claims are to be embraced within their scope.

What is claimed is:

1. An inflatable curtain positioning system, comprising:
   a curtain inflator for generating inflator gas, the inflator comprising a housing having a neck;
   a protrusion disposed on the neck; and an inflatable curtain having a throat configured to be disposed around the neck and an opening disposed on the throat, the opening being configured to receive the protrusion only when the curtain is positioned at a desired location relative to the housing; wherein the curtain further comprises an angle of deployment, and wherein the opening receives the protrusion only when the angle of deployment of the curtain is at the desired location relative to the housing.

2. The inflatable curtain positioning system as defined in claim 1, wherein the housing further comprises a longitudinal axis, and wherein the opening receives the protrusion only when the curtain is positioned at the desired location along the longitudinal axis of the housing.

3. The inflatable curtain positioning system as defined in claim 1, wherein the protrusion projects away from the housing in a generally perpendicular direction.

4. The inflatable curtain positioning system as defined in claim 1, wherein the housing comprises a proximal end and a distal end, the proximal end being closer to the neck than the distal end, and wherein the protrusion curves toward the distal end.

5. The inflatable curtain positioning system as defined in claim 1, further comprising:
   at least one additional protrusion disposed on the neck; and
   at least one additional mating opening disposed on the throat, the openings being configured such that each of the protrusions is positioned within one of the openings only when the curtain is positioned at a desired location relative to the housing.

6. The inflatable curtain positioning system as defined in claim 5, wherein the protrusions are positioned at irregularly spaced intervals along a perimeter of the housing.

7. The inflatable curtain positioning system as defined in claim 1, further comprising:
   a clamp to secure the curtain to the housing when the curtain is positioned at the desired location relative to the housing such that the inflator and curtain are placed in fluid communication.

8. An inflatable curtain positioning system, comprising:
   a curtain inflator for generating inflator gas, the inflator comprising a housing having a neck;
   at least one protrusion disposed on the neck; and an inflatable curtain having a throat configured to be disposed around the neck and at least one opening disposed on the throat, each opening being configured such that each protrusion is positioned within an opening only when the curtain is positioned at a desired location relative to the housing; wherein the curtain further comprises an angle of deployment, and wherein the opening receives the protrusion only when the angle of deployment of the curtain is at the desired location relative to the housing.

9. The inflatable curtain positioning system as defined in claim 8, wherein the housing further comprises a longitudinal axis, and wherein the opening receives the protrusion only when the curtain is positioned at the desired location along the longitudinal axis of the housing.

10. The inflatable curtain positioning system as defined in claim 8, wherein at least one protrusion projects away from the housing in a generally perpendicular direction.

11. The inflatable curtain positioning system as defined in claim 8, wherein the housing comprises a proximal end and a distal end, the proximal end being closer to the neck than the distal end, and wherein at least one protrusion curves toward the distal end.

12. The inflatable curtain positioning system as defined in claim 8, wherein the at least one protrusion comprises a plurality of protrusions, the plurality of protrusions being positioned at irregularly spaced intervals along a perimeter of the housing.

13. The inflatable curtain positioning system as defined in claim 8, further comprising:

a clamp to secure the curtain to the housing when the curtain is positioned at the desired location relative to the housing such that the inflator and curtain are placed in fluid communication.

14. An inflatable curtain positioning system, comprising:

a curtain inflator for generating inflator gas, the inflator comprising a housing having a neck; a hook disposed on the neck; and an inflatable curtain having a throat configured to be disposed around the neck and an opening disposed on the throat, the opening being configured to receive the hook only when the curtain is positioned at a desired location relative to the housing.

15. The inflatable curtain positioning system as defined in claim 14, further comprising:

at least one additional hook disposed on the neck; and at least one additional mating opening disposed on the throat, the openings being configured such that each of the hooks is positioned within one of the openings only when the curtain is positioned at the desired location relative to the housing.

16. The inflatable curtain positioning system as defined in claim 15, wherein the hooks are positioned at irregularly spaced intervals along a perimeter of the housing.

17. The inflatable curtain positioning system as defined in claim 15, wherein the housing comprises a proximal end and a distal end, the proximal end being closer to the neck than the distal end, and wherein at least one hook curves toward the distal end.

18. The inflatable curtain positioning system as defined in claim 14, further comprising:

a clamp to secure the curtain to the housing when the curtain is positioned at the desired location relative to the housing such that the inflator and curtain are placed in fluid communication.

19. A method for placing an inflatable airbag curtain at a desired location relative to an inflator, comprising:

providing a curtain inflator for generating inflator gas, the inflator comprising a housing having a neck; a protrusion disposed on the neck; an inflatable curtain having a throat configured to be disposed around the neck and an opening disposed on the throat, the opening being configured to receive the protrusion only when the curtain is positioned at a desired location relative to the housing; and a clamp configured to secure the curtain to the housing when the curtain is positioned at the desired location; wherein the curtain further comprises an angle of deployment, and wherein the opening receives the protrusion only when the angle of deployment of the curtain is at the desired location relative to the housing;

placing the throat around the neck;

positioning the curtain relative to the housing such that the protrusion is disposed within the opening; and securing the curtain to the housing with the clamp.

20. The method as defined in claim 19, wherein the protrusion curves toward the distal end.

* * * * *